United States Patent Office.

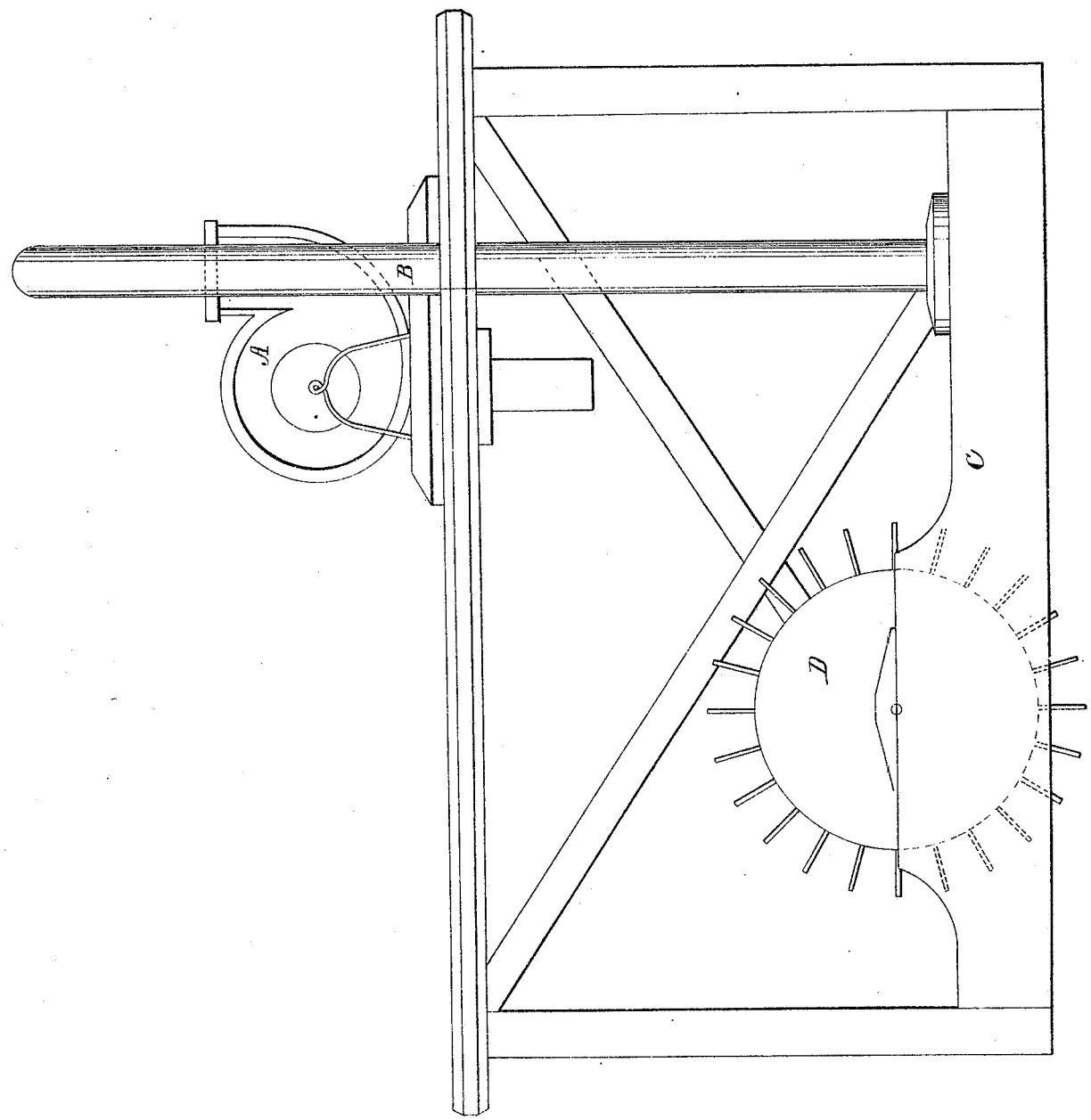

JAMES R. McCLINTOCK AND JOHN K. SCOTT, OF NEW ORLEANS, LOUISIANA.

Letters Patent No. 61,227, dated January 15, 1867.

IMPROVED DREDGING MACHINE.

*The Schedule referred to in these Letters Patent and making part of the same.*

TO ALL WHOM IT MAY CONCERN:

Be it known that we, JAMES R. McCLINTOCK and JOHN K. SCOTT, both of the city of New Orleans, parish of Orleans, and State of Louisiana, have jointly invented a new and useful improvement in Dredging or Excavating Machines; and we do hereby declare the following to be a full, clear, and exact description of the same, reference being had to the annexed drawings, making part of this specification.

In many American rivers, particularly at the mouths thereof, and at the entrance of most American harbors, bays, etc., are found what are technically called "bars," which greatly interfere with and obstruct the navigation of the same, oftentimes to the great injury of private as well as public interests. These bars, when they exist in the bed of rivers, or along their course, are usually produced by the action of shifting currents alone; but when they are formed at the mouths of rivers, or at the entrance of harbors, bays, etc., they are nearly always the result of the combined action of currents, tides, and winds. The bar at the mouth of the Mississippi river, for example, is due chiefly to the deposition of fine particles of earth, that, disengaged and held in suspension by the current, are brought down by it from points above and precipitated at the point at which the current, meeting and mingling with the waters of the Gulf of Mexico, ceases to flow rapidly; but the tides from the Gulf also have some agency in their creation, as well as the wind.

Our invention has for its object the removal of these impediments to navigation and commerce, whatever may be the cause producing them, and wherever they are situated; and it consists of a combination of mechanical elements and forces, so arranged that by the co-operation and conjoint action of the same, deep excavations or channels may be made across or through said bars with great facility and rapidity, and, relatively to all other machines of which we have any knowledge, at very small cost or outlay of money.

Having thus in brief general terms indicated the nature of our invention, and pointed out the end we expect to accomplish with it, we now proceed to describe in detail the several parts of which it is composed. Referring to the drawings, which show a side elevation of our invention—

A represents a forcing-pump of twelve or fifteen inches diameter; B a hose or pipe connected with and leading downwardly from the pump to a point very near the surface of the bar through which a channel is to be cut. C is an adjustable framework, which we shall designate a "guide," that serves the twofold purpose of supporting an appliance for breaking up and stirring the mud or sand of which the bar is composed and of holding in position the lower end of hose or pipe B. D is an appliance for breaking and stirring up the surface of the bar, which we call a "stirrer." Upon the drawings this stirrer appears in the form of a revolving cylindrical harrow, or wheel, whose closed perimeter is filled with projecting bolts or teeth. The teeth that project from the perimeter of the stirrer only show about half their length beneath the guard C. This arrangement is intended to prevent the clogging of the stirrer by an accumulation of earth or mud upon its perimeter, which might possibly occur if the said perimeter were to come into actual contact with the surface of the bar, whenever the composition of the latter should chance to be of a sticky or glue-like consistency. Our arrangement, it will be observed, through the interposition of guard C, establishes a vacant space between the perimeter of the stirrer and any earth that might cling to the teeth, into which space the artificial current produced by the action of the pumps would force its way and wash off such clinging earth. In lieu of the revolving cylindrical harrow shown upon the drawings, and which, we here remark, we consider the very best appliance for the purpose that can be devised, we may sometimes find it advisable to use Bishop's patented screw excavator and sometimes an ordinary drag working in right and horizontal lines, and we desire it to be understood we consider both of these latter contrivances as in some sort the equivalents of our revolving stirrer, though not nearly so good or effective when used with the other parts of our invention. The guide C is made adjustable not only to secure the proper position and working of the stirrer, of whatever description the same may be, but also because through its instrumentality and aid the lower ends of the pipes or hose are brought near the surface of the bar and held in position there, and thus the artificial current they conduct is made to impinge directly or obliquely upon the said surface, as circumstances may require, with full force and effect. The intervention of any considerable space between the lower ends of said pipes or hose and the surface of the bar would greatly diminish the force of the current and impair its effectiveness for the purpose sought after, and hence this adjustable guide becomes one of the most important if not the very most important feature of our invention. In certain circumstances, or as to bars of certain soft alluvial composition, no stirrer is required, and this element of our invention may be entirely dispensed with, the artificial current brought into existence by the pumps being alone sufficient to make the required excavation. In such case the adjustability of the guide C is of incalculable importance, because thereby, and only thereby, can the lower ends of the pumps be brought near to the surface of the bar in which the channel is to be cut, and thus the artificial current from the pumps be made to be completely effective and sufficient. In the drawings the means for adjusting said guide C are not shown, the said means forming no part of our invention, but only the adjustability itself. Any mechanic of ordinary skill in his profession will readily understand how to make the guide adjustable to varying depths of water without the aid of diagrams or drawings, which could, at best, point out or illustrate only one method or plan of doing so. Nor do we mean to confine ourselves to any particular arrangement of the guide C. Any contrivance which shall be sufficient to control the direction of the lower ends of the pipes or hose B, and hold the same in position to act effectively in varying depths of water, provided always it does not differ in principle from our arrangement, we regard as the equivalent of ours.

In the actual operation or practice of our invention it is placed upon or underneath a suitable boat constructed for the purpose, and provided with a steam engine of sufficient power to work rapidly two or more pumps, such as we have described, of from fifteen to twenty inches diameter. If excavating a channel through the bar at the mouth of the Mississippi river, we should use four pumps, two of twelve and two of fifteen inches diameter, and, owing to the composition of said bar, we should not probably use a stirrer at all, the current produced by the pumps being alone sufficient to cut a channel of a sufficient depth to allow of the passage through it of the largest ships. The boat being provided with our invention and the steam engine to which we have referred, it is put into position on the bar, and the engine being started, the stirrer, if the bar be of a character to require the same, begins to revolve and break up the surface of the bar, whilst at the same time a powerful artificial current is brought to bear upon the same from the action of the pumps through the pipes or hose B. This current may impinge directly or obliquely upon the earth, but in either case an excavation is speedily made, as we have demonstrated by actual experiment, not once, but repeatedly. On a recent trial, under a depth of fifty feet of water at the bottom of the Mississippi river, we produced an excavation twenty-five feet deep in a few hours' time by the action of our pumps alone. The boat moving on, and the machine continuing in operation, a channel is cut through the bar of a width something greater than the width of the boat or machine. If it be desirable to have the channel wider than this, it is obviously only necessary to make a second cut, running into or overlapping the first. We have not considered it necessary to describe in what manner our invention is to be operated by the steam engine, because we design to employ any suitable gearing for that purpose without laying any claim whasoever to the same. Nor have we deemed it necessary to show upon the drawings more than one forcing-pump and one pipe or hose, although in fact we always use more than one pump, and, of course, for every pump there is a pipe, since all the pumps we may use are substantially identical, and the delineation of one may be considered a delineation of all, and so of the hose.

Having thus described our invention, what we claim, and desire to secure by Letters Patent, is—

1. The adjustable framework or guide C, for adjusting and holding in proper position the lower ends of the pipes or hose B, and for supporting the stirrer D, when the same is used, as described, for the purpose set forth.

2. The combination of the adjustable guide C, with the pipes or hose B, and the forcing-pumps A, as described, for the purpose set forth.

3. The combination of the forcing-pumps A, pipes or hose B, adjustable guide C, with the stirrer D, or its mechanical equivalent, substantially as described, for the purpose set forth.

JAMES R. McCLINTOCK,
JOHN K. SCOTT.

Witnesses:
RUFUS R. RHODES,
EMILE ROST.